(12) United States Patent
Takemoto et al.

(10) Patent No.: US 7,519,218 B2
(45) Date of Patent: Apr. 14, 2009

(54) MARKER DETECTION METHOD AND APPARATUS, AND POSITION AND ORIENTATION ESTIMATION METHOD

(75) Inventors: Kazuki Takemoto, Kawasaki (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 11/091,624

(22) Filed: Mar. 29, 2005

(65) Prior Publication Data
US 2005/0234333 A1 Oct. 20, 2005

(30) Foreign Application Priority Data
Mar. 31, 2004 (JP) ............... 2004-106243

(51) Int. Cl.
*G06K 9/00* (2006.01)
(52) U.S. Cl. ............... 382/165; 382/282; 382/291
(58) Field of Classification Search ......... 382/162, 382/164, 165, 195, 282, 286, 287, 291
See application file for complete search history.

(56) References Cited

U.S. PATENT DOCUMENTS

| | | | | |
|---|---|---|---|---|
| 5,220,416 A | * | 6/1993 | Hasebe et al. ............... 358/517 |
| 5,974,171 A | * | 10/1999 | Hayashi et al. ............. 382/162 |
| 6,522,312 B2 | | 2/2003 | Ohshima et al. ............... 345/8 |
| 6,792,370 B2 | | 9/2004 | Satoh et al. ................... 702/95 |
| 6,993,450 B2 | | 1/2006 | Takemoto et al. ........... 702/153 |
| 2002/0084974 A1 | | 7/2002 | Ohshima et al. ............ 345/156 |
| 2003/0080976 A1 | | 5/2003 | Satoh et al. ................. 345/629 |
| 2004/0249594 A1 | | 12/2004 | Satoh et al. ................. 702/104 |
| 2005/0234333 A1 | | 10/2005 | Takemoto et al. ........... 600/426 |

FOREIGN PATENT DOCUMENTS

JP 11-136706 5/1999

OTHER PUBLICATIONS

H. Tamura, et al., "Mixed Reality: Future Dreams Seen at the Border Between Real and Virtual Worlds", Computer Graphics and Applications, vol. 21, No. 6, pp. 64-70 (2001).
H. Kato, et al., "An Augmented Reality System and its Calibration Based on Marker Tracking", TVRSJ, vol. 4, No. 4, pp. 607-616 (1999).
S. Uchiyama, et al., "A Robot Registration Method for Merging Real and Virtual Worlds—Combining 6 DOF Sensor and IPC Algorithm", Proc. I of Meeting on Image Recognition and Understanding (MIRU 2002), IPSJ Symposium Series, vol. 2002, No. 11, pp. I.107-I.112 (2002).

* cited by examiner

*Primary Examiner*—Phuoc Tran
(74) *Attorney, Agent, or Firm*—Fitzpatrick, Cella, Harper & Scinto

(57) ABSTRACT

A marker detection method includes the steps of acquiring a captured image, detecting a marker from the captured image, and determining whether or not a surrounding region of the detected marker includes a pixel of a predetermined color. An additional step includes determining, as a valid marker, a marker for which it is determined that the surrounding region does not include any pixel of the predetermined color.

15 Claims, 15 Drawing Sheets

FIG. 5A
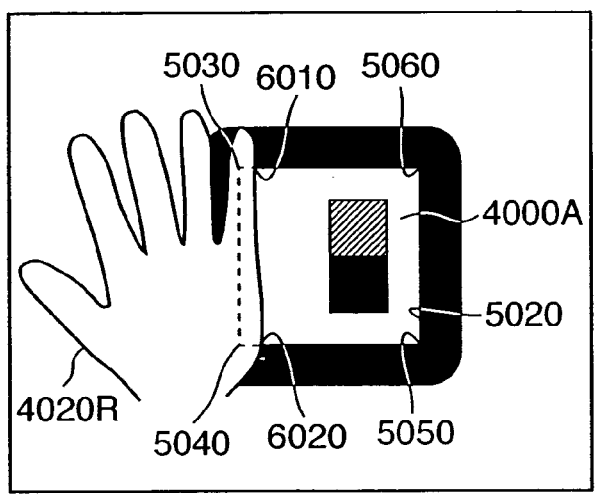
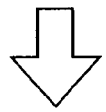
FIG. 5B
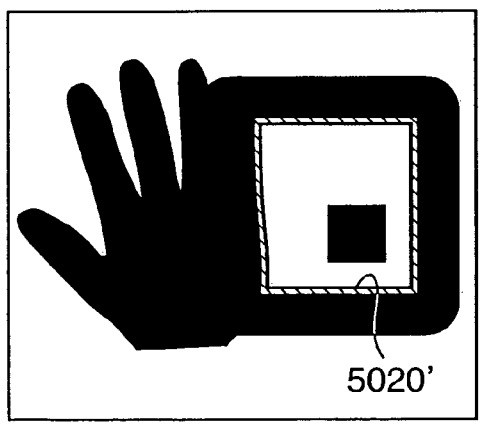
FIG. 5C
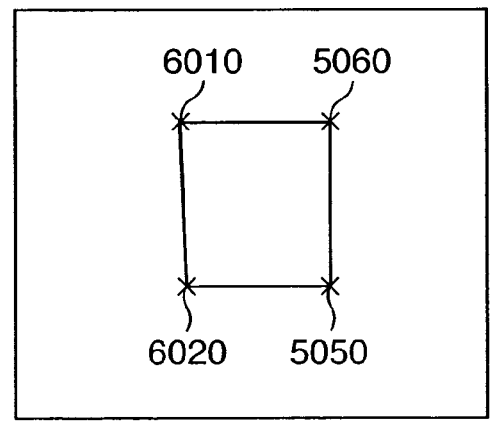

F I G. 6A
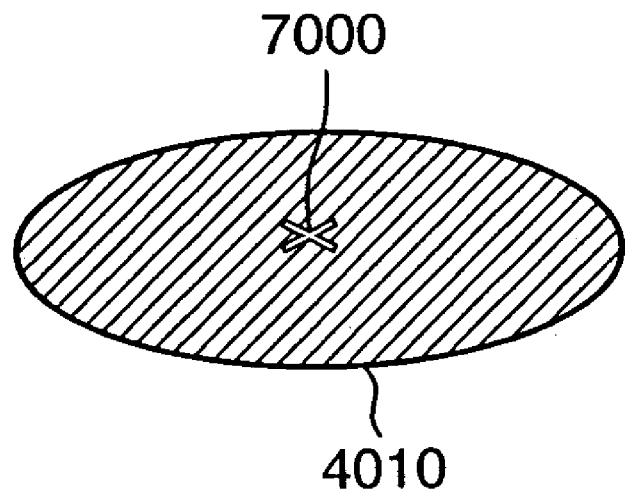
F I G. 6B
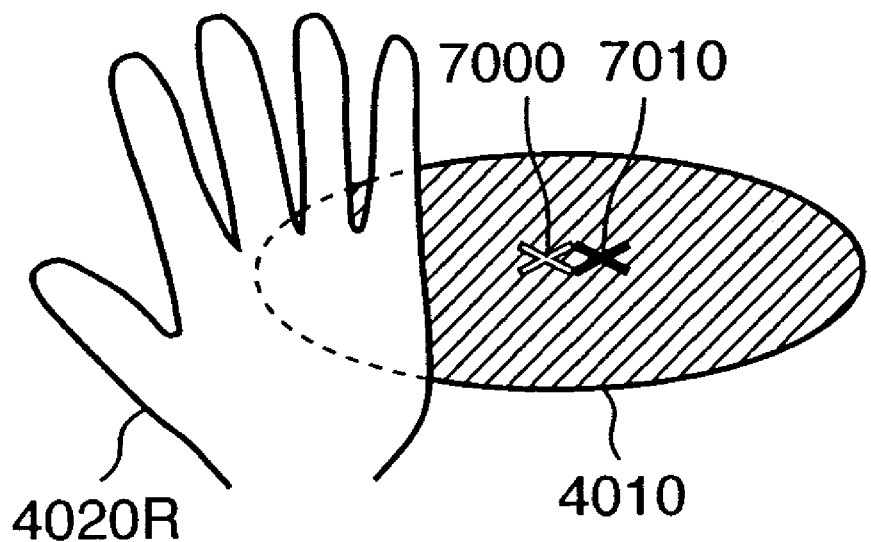

F I G. 12

| No. | VERTEX 1 | VERTEX 2 | VERTEX 3 | VERTEX 4 | MARKER ID |
|---|---|---|---|---|---|
| 1 | (x1, y1) | (x2, y2) | (x3, y3) | (x4, y4) | A |
| ... | ... | ... | ... | ... | ... |

F I G. 13

| No. | VERTEX 1 | VERTEX 2 | VERTEX 3 | VERTEX 4 | MARKER ID |
|---|---|---|---|---|---|
| 1 | (x1, y1, f) | (x2, y2, f) | (x3, y3, f) | (x4, y4, f) | A |
| ... | ... | ... | ... | ... | ... |

MARKER DETECTION METHOD AND APPARATUS, AND POSITION AND ORIENTATION ESTIMATION METHOD

FIELD OF THE INVENTION

The present invention relates to a technique for detecting a region (marker) having a predetermined visual feature from an image and, more particularly, to a technique for eliminating an erroneously detected marker.

BACKGROUND OF THE INVENTION

A mixed reality (MR) space presentation system presents an MR space image generated by compositing an image on a real space and that on an unreal space (virtual space) via a head-mounted display (HMD), thus allowing the user who wears the HMD to experience the MR space (or MR) (see H. Tamura, H. Yamamoto and A. Katayama: "Mixed reality: Future dreams seen at the border between real and virtual worlds," Computer Graphics and Applications, vol. 21, no. 6, pp. 64-70, 2001).

In such MR space representation system, as a method of detecting the position and orientation of an image sensing device that captures the real space (or the position and orientation of a real object with respect to the image sensing device), a method using markers (also called landmarks) is known, as described in, e.g., Kato et. al.: Augmented Reality System and its Calibration based on Marker Tracking", TVRSJ, Vol. 4, No. 4, pp. 607-616 (1999). In this method, objects (markers) each having a predetermined visual feature are laid out at known three-dimensional (3D) coordinate positions on the real space, markers included in a captured image are detected, and the position and orientation of an image sensing device are detected on the basis of two-dimensional (2D) image positions of elements (the barycenter, vertices, and the like of each marker) of the detected markers and the known 3D coordinate positions.

Shinji Uchiyama, Hiroyuki Yamamoto, and Hideyuki Tamura: "Robust Registration Method for Merging Real and Virtual Worlds -Combining 6 DOF Sensor and ICP Algorithm-", Proc. I of Meeting on Image Recognition and Understanding (MIRU 2002), IPSJ Symposium Series, vol. 2002, no. 11, pp. I.107-I.112, 2002, discloses a method of repetitively correcting the position and orientation of an image sensing unit to minimize an error of corresponding points on a screen to have the position and orientation of 6 degree-of-freedom sensor, with a measurement error, as initial values.

Japanese Patent Laid-Open No. 11-136706 also discloses a method of obtaining the position and orientation of an image sensing device using markers and a position and orientation sensor in combination. In this method, a 6 or 3 DOF (degree-of-freedom) sensor, the measurement range of which is limited and which has measurement errors is fixed to an image sensing device, and position and orientation information measured by the 6 or 3 DOF sensor and position and orientation information obtained by marker detection on a captured image are combined, thereby improving the measurement precision.

In any of these methods, the precision of the obtained position and orientation largely depends on the marker detection precision. For example, if a plurality of regions recognized as markers from a captured image include at least one erroneously detected one, the finally obtained precision of the position and orientation impairs considerably. As a factor that induces such detection errors, an object having an image feature similar to each marker may exist on the captured real space.

In order to avoid erroneous detection of a region having a similar feature other than markers, a method of using markers having visual features (shapes, patterns, colors, and the like) having a lower probability of existence on the real space is often adopted.

However, as factors that lower the calculation (estimation) precision of the position and orientation using markers, those other than "erroneous detection of an object other than markers" are present: for example, the precision drop resulting from a marker partially occluded by another object so as not to disturb detection (to be referred to as a partially-occluded marker hereinafter). Since the partially-occluded marker is detected as a region having a shape different from a region to be detected, the barycentric position and the coordinates of vertices are erroneously recognized or calculated, thus deteriorating the final position and orientation calculation precision of an image sensing device. In the following description, a state wherein marker information cannot be correctly obtained due to partial occlusion of a marker will be referred to as erroneous detection due to partial occlusion.

FIGS. 5A to 5C and FIGS. 6A and 6B are for explaining examples of erroneous detection due to partial occlusion. In FIGS. 5A to 5C, a marker (rectangular marker 4000A) includes a rectangle 5020. When such marker is used, four vertices (5030, 5040, 5050, and 5060) of the rectangle 5020 must be correctly detected.

However, when the two vertices 5030 and 5040 of the four vertices of the rectangle 5020 are occluded by a user's hand 4020R, and the rectangle 5020 is detected by an image process (e.g., binarization) shown in FIG. 5B, contacts 6010 and 6020 between the hand 4020R and rectangle 5020 are erroneously recognized as the vertices 5030 and 5040 (FIG. 5C).

FIGS. 6A and 6B show a case wherein a marker (color region marker 4010) shown in FIG. 6A is partially occluded by the user's hand 4020R, as shown in FIG. 6B. In this case, a wrong position 7010 is detected in place of an original position 7000 as the barycentric point of the marker.

The position and orientation of the image sensing device using markers are calculated based on correspondence between the known vertices or barycentric position of a marker (or a pattern of the marker) on the world coordinate system, and coordinates on the coordinate system of the image sensing device. Therefore, when the feature points (vertices, barycenter, or the like) of the marker detected in an image are erroneously detected, the precision of the finally obtained position and orientation information impairs.

However, with the conventional marker detection method, erroneous detection due to partial occlusion cannot be determined even if it has occurred.

SUMMARY OF THE INVENTION

The present invention has been made in consideration of the conventional problems, and has as its principal object to suppress use of feature points (the vertex coordinates or barycentric position in the above examples) of a marker which are erroneously detected due to partial occlusion of the marker.

According to an aspect of the present invention, there is provided a marker detection method comprising steps of: acquiring a captured image; detecting a marker from the captured image; determining whether or not a surrounding region of the detected marker includes a pixel of a predetermined color; and determining, as a valid marker, a marker for which it is determined that the surrounding region does not include any pixel of the predetermined color.

According to another aspect of the present invention, there is provided a program for making a computer execute steps of a marker detection method, the method comprising steps of: acquiring a captured image; detecting a marker from the captured image; determining whether or not a surrounding region of the detected marker includes a pixel of a predetermined color; and determining, as a valid marker, a marker for which it is determined that the surrounding region does not include any pixel of the predetermined color.

According to a further aspect of the present invention, there is provided an information processing method comprising steps of: acquiring a captured image; detecting a marker from the captured image; detecting a predetermined color region from the captured image; and determining, based on a position of the predetermined color region and a position of the marker, whether or not the marker is valid.

According to another aspect of the present invention, there is provided a program for making a computer execute steps of an information processing method, the method comprising steps of: acquiring a captured image; detecting a marker from the captured image; detecting a predetermined color region from the captured image; and determining based on a position of the predetermined color region and a position of the marker whether or not the marker is valid.

According to another aspect of the present invention, there is provided a marker detection apparatus comprising: acquiring unit adapted to acquire a captured image; detecting unit adapted to detect a marker from the captured image; first determining unit adapted to determine whether or not a surrounding region of the detected marker includes a pixel of a predetermined color; and second determining unit adapted to determine, as a valid marker, a marker for which it is determined that the surrounding region does not include any pixel of the predetermined color.

According to another aspect of the present invention, there is provided an information processing apparatus comprising: acquiring unit adapted to acquire a captured image; first detecting unit adapted to detect a marker from the captured image; second detecting unit adapted to detect a predetermined color region from the captured image; and determining unit adapted to determine, based on a position of the predetermined color region and a position of the marker, whether or not the marker is valid.

With the above arrangement, since a marker which may suffer partial occlusion is determined on the basis of a color included in an adjacent region of the marker region, use of the erroneously detected feature points of the marker can be suppressed. Hence, the estimation precision when markers are used in position and orientation estimation of an image sensing unit can be improved.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5C and FIGS. 6A and 6B are views for explaining erroneous detection due to partial occlusion of a marker;

FIG. 12 shows an example of a detection marker list in the first embodiment;

FIG. 13 shows an example of a detection marker list in modification 2 of the first embodiment;

DETAILED DESCRIPTION OF THE PREFERRED EMBODIMENTS

Figure 1:
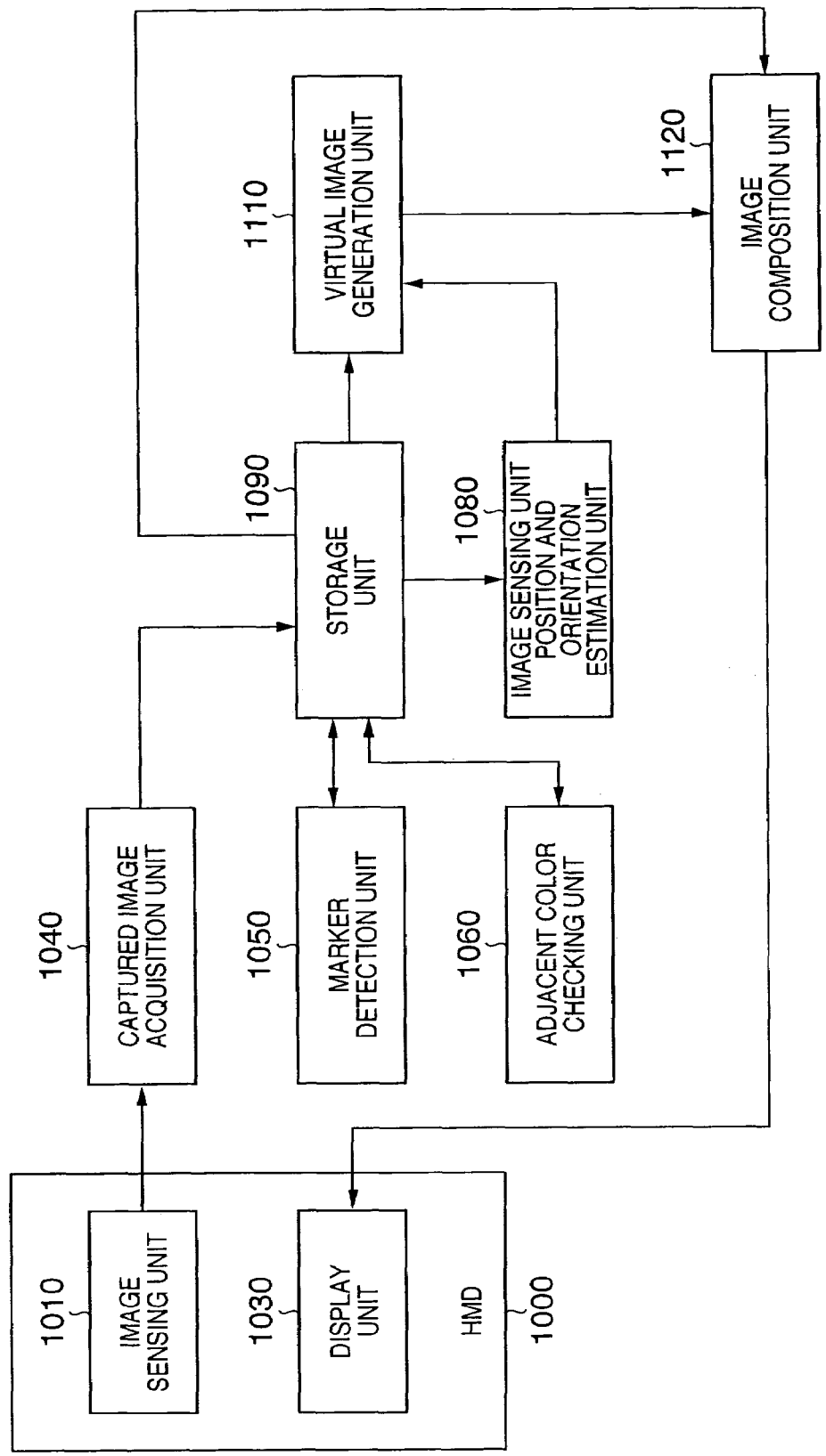
FIG. 1 is a block diagram showing an example of the functional arrangement of an MR space presentation system including a marker detection apparatus according to the first embodiment of the present invention.

Preferred embodiments of the present invention will now be described in detail in accordance with the accompanying drawings.

First Embodiment

A case will be explained hereinafter wherein a marker detection apparatus according to an embodiment of the present invention is applied to a mixed reality (MR) space presentation system using a video see-through type head-mounted display (HMD).

A marker detection apparatus of this embodiment can precisely detect the position and orientation of an image sensing unit (the term "image sensing unit" indicates a pair of right and left cameras together unless otherwise specified) attached to the video see-through type HMD. As a result, an image on a virtual space rendered by computer graphics or the like can be correctly aligned to a real space image obtained by capturing a real space when they are superimposed and composited, and the user who observes this composite image via the HMD can naturally experience the mixed reality space (to be referred to as MR space hereinafter).

The MR space presentation system presents an MR space image generated by compositing an image on a real space and that on an unreal space (virtual space) via the HMD, thus allowing the user who wears the HMD to experience the MR space (or MR). Note that information about such technique associated with MR (MR technique) can be acquired from, e.g., H. Tamura, H. Yamamoto and A. Katayama: "Mixed reality: Future dreams seen at the border between real and virtual worlds," Computer Graphics and Applications, vol. 21, no. 6, pp. 64-70, 2001.

In order to express the MR space, it is indispensable to obtain a relative position and orientation relationship between a reference coordinate system defined on the real space (a coordinate system on the real space which serves as a reference upon determining the position and orientation of a virtual object to be superimposed on the real space), and a coordinate system of an image sensing unit (camera coordinate system). This is because in order to naturally superimpose a virtual object (virtual space image) onto a real space image, the image of the virtual object must be generated using the same camera parameters as actual camera parameters (i.e., camera internal parameters such as the focal length, principal point, and the like, and camera external parameters indicating the position and orientation of the image sensing unit) of the image-sensing unit used to capture a real space image. Since the camera internal parameters are unchanged values unique to the image sensing unit, they can be prepared in advance. For example, when a virtual object is superimposed at an arbitrary position on a table as a real object, the reference coordinate system is defined on the table, and the position and orientation (camera external parameters) of the image sensing unit on that reference coordinate system can be detected. When an arbitrary virtual pattern or label is superimposed on a real box held by the hand of an observer, an object coordinate system of the box itself is considered as the reference coordinate system, and the position and orientation of the box (reference coordinate system) on the camera coordinate system can be detected.

Note that the position and orientation of the image sensing unit (camera coordinate system) relative to the reference coordinate system will be referred to as the "position and orientation of the image sensing unit" hereinafter for the sake of convenience. The relative position and orientation between the reference coordinate system and image sensing unit generically name the position and orientation of the image sensing unit with respect to the reference coordinate system, those of the reference coordinate system with respect to the image sensing unit, or information that allows unique conversion and essentially indicates an identical event such as data formats that can express them (e.g., a coordinate conversion matrix from the reference coordinate system to the camera coordinate system, or a coordinate conversion matrix from the camera coordinate system to the reference coordinate system).

In this embodiment, markers laid out on a real object are detected from a captured image, and the position and orientation of the image sensing unit are estimated to have the object coordinate system as the reference coordinate system using the marker detection result. According to the marker detection apparatus of this embodiment, even when the aforementioned erroneous detection due to partial occlusion has occurred, such detection can be determined as erroneous detection, and the position and orientation of the image sensing unit can be precisely obtained since the erroneously detected information is not used.

<Arrangement>

Figure 2:
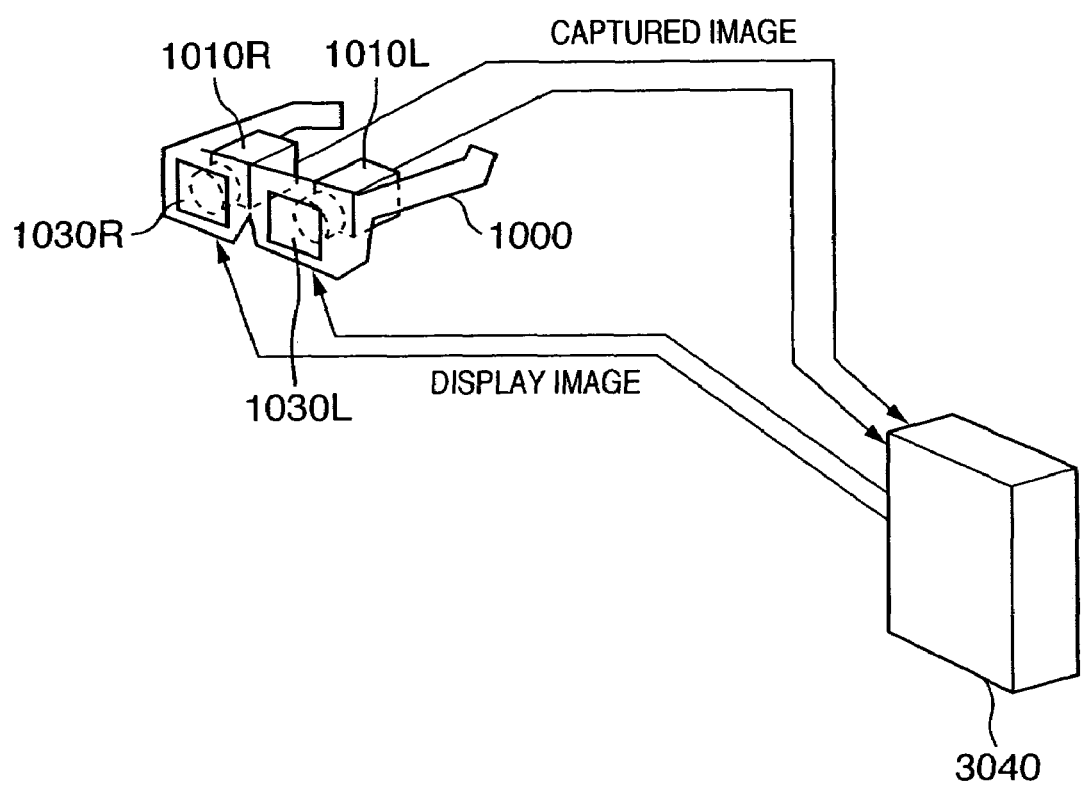
FIG. 2 is a schematic view showing an example of the outer appearance of the MR space presentation system in the first embodiment.
Figure 3:
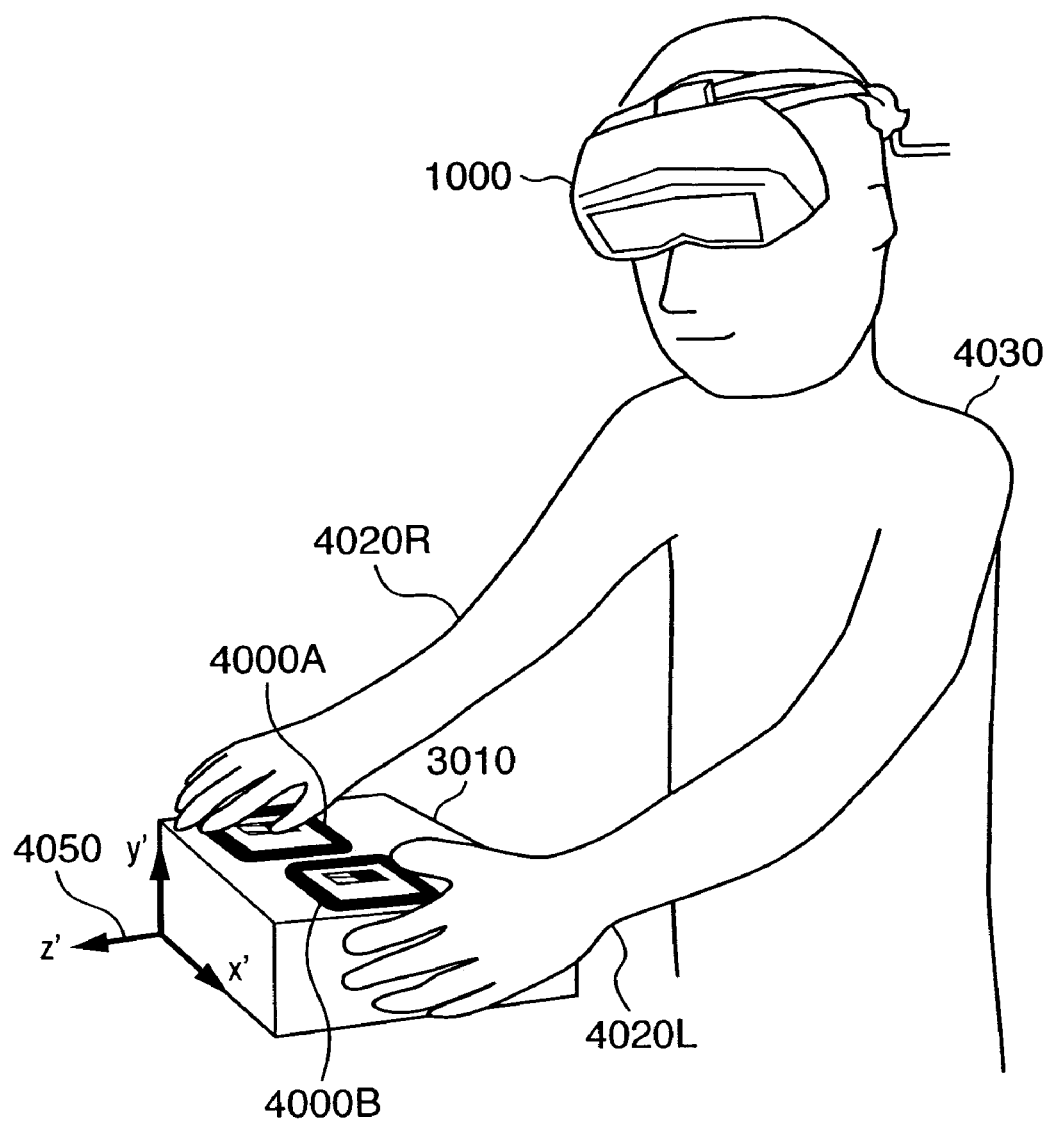
FIG. 3 illustrates a situation upon operation of the MR space presentation system in the first embodiment.

FIG. 1 is a block diagram showing an example of the functional arrangement of the MR space presentation system including the marker detection apparatus according to this embodiment. FIG. 2 illustrates the outer appearance of this MR space presentation system. FIG. 3 shows a state upon use of this MR space presentation system. Note that the same reference numerals denote the same parts throughout the figures.

In this embodiment, assume that the MR space presentation system uses a movable object 3010 whose position and orientation can be changed by an observer (user) 4030, and displays a virtual object near the movable object 3010 in accordance with the position and orientation of the movable object 3010.

An HMD 1000 has an image sensing unit 1010 and display unit 1030. In this embodiment, as shown in FIG. 2, two image sensing units 1010 and two display units 1030 are provided; an image sensing unit 1010R and display unit 1030R are used for the right eye, and an image sensing unit 1010L and display unit 1030L are used for the left eye. With this arrangement, disparity images can be presented to the right and left eyes of the observer 4030 who wears this HMD 1000 on the head, thus allowing 3D display of the MR space.

That is, in this embodiment, an MR space image for the right eye generated by superimposing an image of the real space captured by the image sensing unit 1010R and a virtual space image for the right eye generated by a workstation 2040 (this superimposed image will be referred to as an MR image hereinafter) is presented to the right eye using the display unit 1030R. Also, an MR image for the left eye generated by superimposing an image of the real space captured by the image sensing unit 1010L and a virtual space image for the left eye generated by the workstation 2040 is presented to the left eye using the display unit 1030L. As a result, the observer 4030 can observe a stereo MR image. Since a general method associated with generation and presentation of such stereo MR image is known to those who are skilled in the art and is not related to the gist of the present invention, no more explanation will be given.

The marker detection apparatus of this embodiment can also be applied to a system which shares one image sensing unit and one display unit by the right and left eyes (i.e., when the observer 4030 observes a monaural MR image) or a system that displays an MR image for one eye.

As means for acquiring a real space image and presenting MR images to the observer 4030, the HMD is used in this embodiment. However, an arbitrary apparatus can be used as long as it has at least one pair of the image sensing unit 1010 and display unit 1030. Furthermore, the image sensing unit 1010 and display unit 1030 need not be fixed to each other.

For the sake of a simple description and easy understanding, each of the image sensing unit and display unit is handled as one building component except for a case wherein they are specified by adjuncts indicating a stereo image such as for the right eye, for the left eye, and the like. Also, other building components in the system, processes executed by them, and an image to be generated are also handled as one each component, process, and image.

A captured image acquisition unit 1040 inputs a captured image (color image) of the real space captured by the image sensing unit 1010, and outputs it as image data to a storage unit 1090 (to be described later).

Figure 4A:
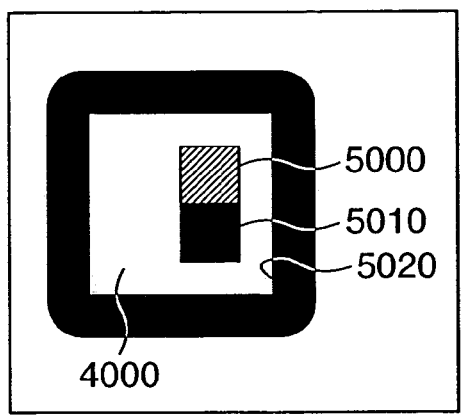
FIGS. 4A to 4C are views for explaining the detection process of a rectangular marker in the first embodiment.

A marker detection unit 1050 detects a marker from the captured image held by the storage unit 1090. In this embodiment, a rectangular shaped marker (to be referred to as a rectangular marker hereinafter) shown in FIG. 4A is used as the marker. As shown in FIG. 4A, a rectangular marker 4000 includes a white rectangular pattern 5020, in which a small black rectangular pattern 5010 indicating the direction of the marker and a small rectangular pattern 5000 (ID pattern) indicating an ID are juxtaposed. Around the white rectangular pattern 5020, a frame having a color that can be easily distinguished from white is formed so as to allow easy detection of the white rectangular pattern 5020. In this embodiment, a region to be detected is the white rectangular pattern 5020, and the frame is not necessary as long as the white rectangular pattern 5020 can be detected. That is, the white rectangular pattern 5020 serves as a marker. For this reason, in the following description, the white rectangular pattern 5020 will be explained as a marker. Of course, a frameless marker shown in FIGS. 6A and 6B may be used. The operation of the marker detection unit 1050 will be described in detail later.

In this embodiment, two rectangular markers 4000A and 4000B having ID patterns 5000 with distinguishably different colors are set on the movable object 3010. Layout information (the 3D coordinates of vertices on an object coordinate system 4050, color information of the ID patterns of respective markers, and the like) of these markers are pre-stored in the storage unit 1090.

An adjacent color checking unit 1060 checks possibility of partial occlusion (erroneous detection) of respective markers included in a list of detected markers generated by the marker detection unit 1050 and stored in the storage unit 1090, and deletes the marker with suspicion of partial occlusion (erroneous detection) from the list of detected markers. The operation of the adjacent color checking unit 1060 will be described in detail later.

The storage unit 1090 stores information required for processes of the MR space presentation system of this embodiment, and reads out and updates the information according to the processes. The information required for the processes of the MR space presentation system includes, e.g., information generated during the processes such as a captured image, a binary image to be described later, a detected marker list (IDs and image coordinates of respective vertices), and the like, in addition to information prepared in advance such as marker layout information, vertex information of a virtual object to be rendered, layout information of the virtual object, and the like.

A virtual image generation unit 1110 generates (renders) an image of a virtual object viewed from the position and orientation of the image sensing unit on the basis of the position and orientation of the image sensing unit 1010 output from an image sensing unit position and orientation estimation unit 1080, and the information stored in the storage unit 1090.

An image composition unit 1120 generates an image (MR image) by compositing the captured image held by the storage unit 1090 and an image of the virtual object (virtual space image) obtained from the virtual image generation unit 1110. This composition is attained by superimposing the virtual image from the virtual image generation unit 1110 onto the captured image.

During this superimposing process, a region to be displayed in front of the virtual object (e.g., the observer's hand region in FIG. 3) is detected from the captured image, and the virtual space image is not rendered and overwritten on this region (by directly rendering the captured image), thus avoiding the virtual object from being unnaturally rendered on the hand that holds the object 3010.

The image composition unit 1120 outputs the generated MR image to the display unit 1030 of the HMD 1000. As a result, the display unit 1030 displays the MR image obtained by superimposing the real space image and virtual space image according to the position and orientation of the image sensing unit 1010, thus allowing the user who wears the HMD 1000 on the head to experience the MR space.

Note that all functions except for the HMD 1000 in FIG. 1 are included in the functional arrangement of the workstation 3040.

The basic arrangement of the workstation 3040 is the same as that of a computer which is commercially available as a personal computer, and comprises a CPU, RAM, ROM, external storage device (hard disk drive, or the like), storage medium drive (a drive for accessing removable storage media such as a CD, DVD, or the like), video capture board, graphic board, display device (LCD, CRT monitor, or the like), and input device (keyboard, mouse, tablet, joystick, or the like).

The CPU controls the overall workstation 3040, and executes a series of processes from when an MR image is generated until the MR image is output to the display unit 1030 of the HMD 1000. The RAM comprises an area for temporarily storing programs and data loaded from the external storage device or storage medium drive, and also a work area used by the CPU to execute various processes.

The ROM stores programs and data such as a boot program and the like, which are required to control the overall apparatus.

The input device is used by the user (not the observer but the operator of the workstation 3040) to make various settings for an application that implements the MR space presentation system via a GUI displayed on the display device, and to input various instructions.

The external storage device represented by the hard disk drive or the like stores data required for processes and an OS (operating system) on which application software runs, in addition to the application software for implementing the MR space presentation system of this embodiment.

In the MR space presentation system with this arrangement, for example, the storage unit 1090 is implemented by the external storage device, storage medium drive, and RAM, the captured image acquisition unit is implemented by the video capture board, and the image composition unit 1120 is implemented by the graphic board. Also, the marker detection unit 1050, adjacent color checking unit 1060, image sensing unit position and orientation estimation unit 1080, and virtual image generation unit 1110 can be implemented by the CPU using programs and data stored in the RAM and ROM.

<Processing Sequence>

Figure 8:
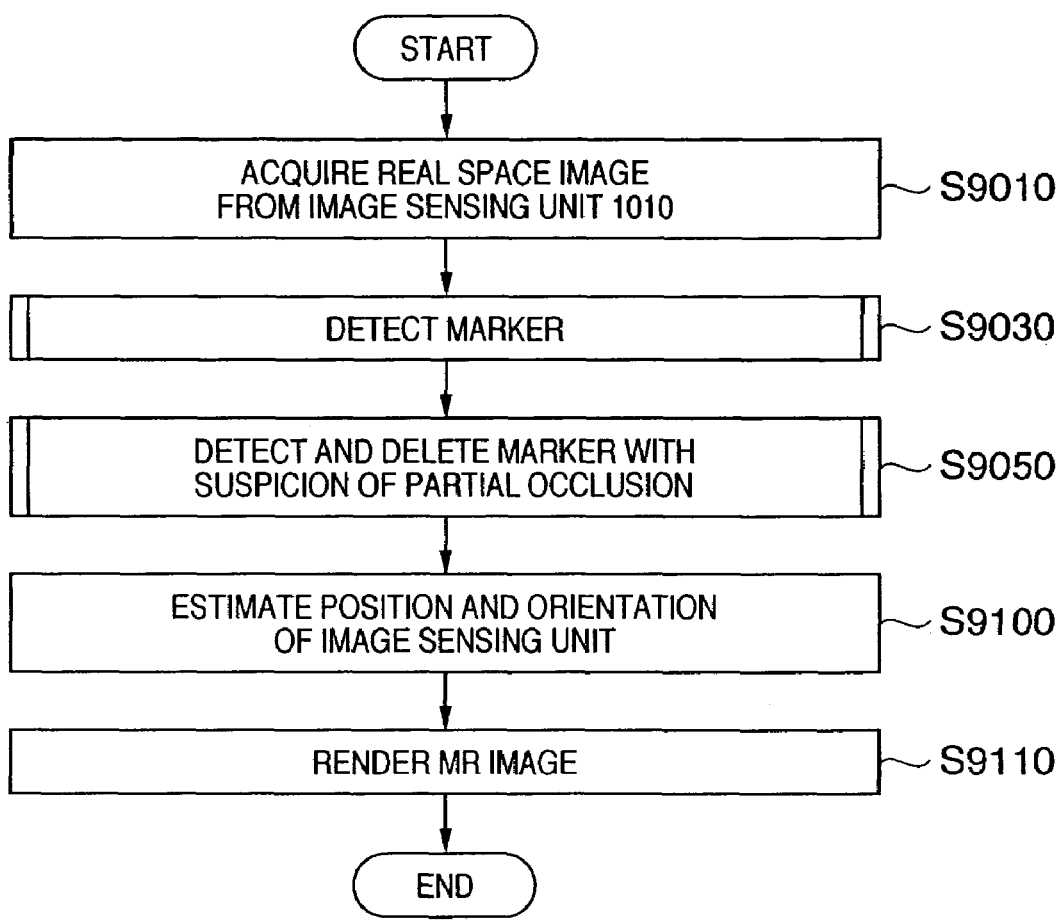
FIG. 8 is a flowchart for explaining the overall process of the MR space presentation system according to the first embodiment.

The flow of the overall processing of the MR space presentation system of this embodiment will be described below with reference to the flowchart of FIG. 8. As described above, this processing is implemented by the CPU of the workstation 3040 by executing the programs stored in the storage unit 1090 to control the respective units of FIG. 1. Note that the processing shown in FIG. 8 is repeated every time one MR image is generated.

In step S9010, the captured image acquisition unit 1040 acquires a captured image captured by the image sensing unit 1010, and writes it in the storage unit 1090.

In step S9030, the marker detection unit 1050 reads out the captured image from the storage unit 1090, executes a marker detection process, and saves a list of the detected markers in the storage unit 1090. Details of the marker detection process will be described later.

In step S9050, the adjacent color checking unit 1060 checks a marker with suspicion of partial occlusion (erroneous detection) from all the markers in the detected marker list held in the storage unit 1090, and deletes data of the marker determined to have suspicion of partial occlusion (erroneous detection) from the list. Details of this process will also be described later.

In step S9100, the image sensing unit position and orientation estimation unit 1080 estimates the position and orientation of the image sensing unit 1010 on the basis of the image coordinates of a plurality of markers in the marker list, and the 3D coordinates of the respective markers on the reference coordinate system, which are registered in advance in the storage unit 1090, and outputs them to the virtual image generation unit 1110. Then, calculating the position and orientation of an image sensing unit which captures projected images on the basis of the 3D coordinates (vertex coordinates of markers and the like) of a plurality of points on the reference coordinate system, and the image coordinates (vertex coordinates of markers detected from a captured image and the like) of their projected images. For example, the method of repetitively correcting the position and orientation of an image sensing unit to minimize an error of corresponding points on a screen to have the position and orientation on a previous frame as initial values, the method of calculating the position and orientation of an image sensing unit using homography operations that use only points in an identical plane, and the like can be used.

According to this embodiment, since information of a marker with suspicion of partial occlusion is not used in the position and orientation estimation process of the image sensing unit by the image sensing unit position and orientation estimation unit 1080, the position and orientation of the image sensing unit can be obtained with higher precision than the conventional method.

In step S9110, the virtual image generation unit 1110 renders an image of a virtual object on the basis of a virtual space model (information required to render the virtual space such as the shape of the virtual object, and the like) prepared in advance, and the position and orientation of the image sensing unit obtained from the image sensing unit position and orientation estimation unit 1080, and outputs the image to the image composition unit 1120. The image composition unit 1120 generates an MR image by superimposing and compositing this virtual image onto the captured image (real space image) read out from the storage unit 1090, and outputs the MR image to the display unit 1030.

<Marker Detection Process>

Figure 10:
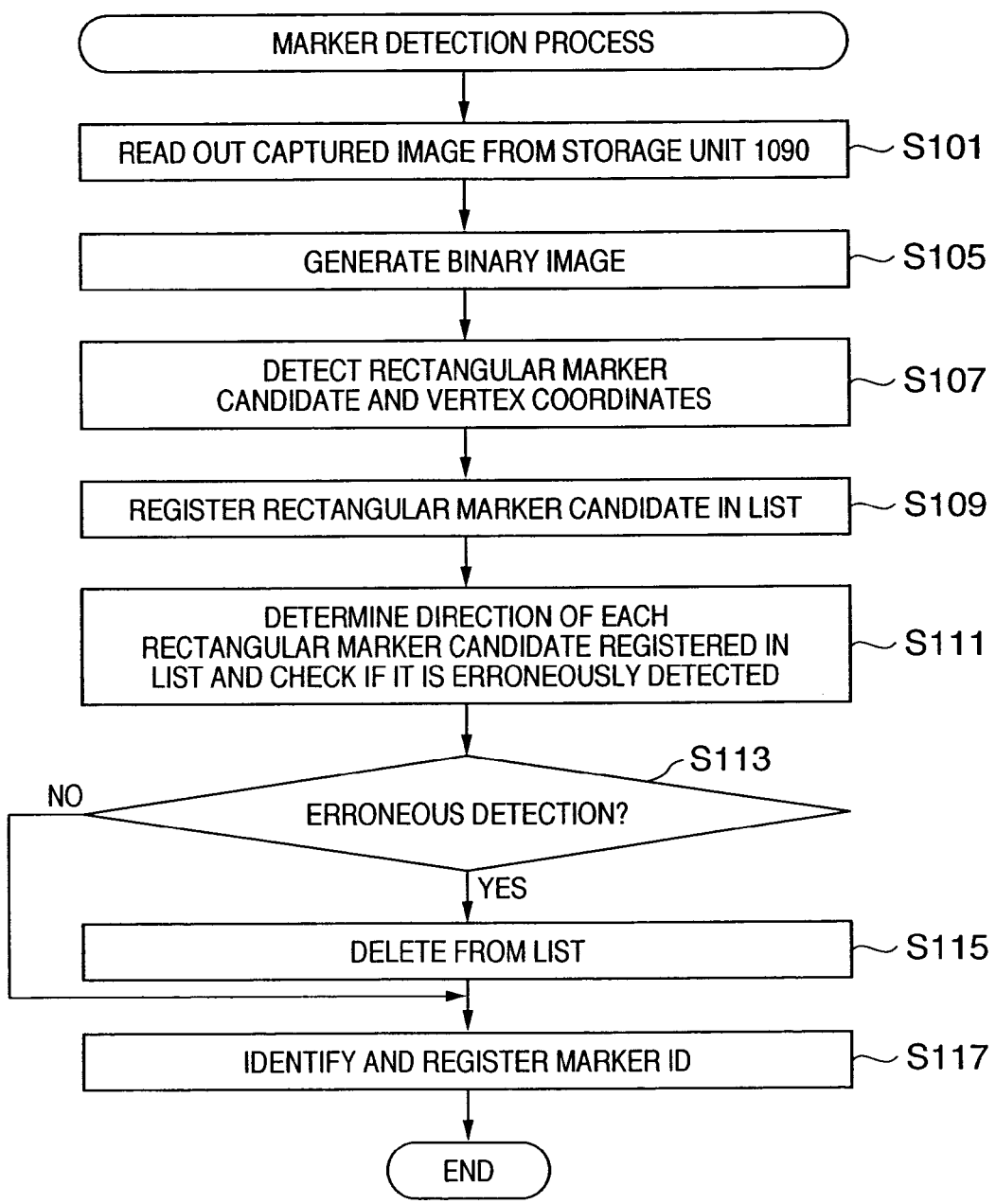
FIG. 10 is a flowchart for explaining the process of a marker detection unit 1050 in the first embodiment.

The marker detection process executed by the marker detection unit 1050 in step S9030 will be described below with reference to the flowchart of FIG. 10.

Figure 4B:
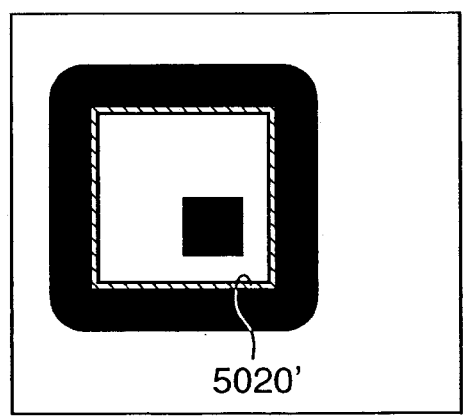

The marker detection unit 1050 reads out the captured image from the storage unit 1090 (step S101). FIG. 4A shows an image of the captured rectangular marker. Then, as shown in FIG. 4B, a monochrome binary image is generated by a threshold process on the basis of lightness values of respective pixels of the image, and is saved in the storage unit 1090 (step S105).

Figure 4C:
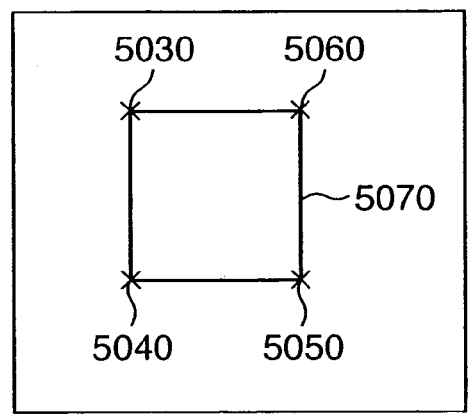

A white region in the generated binary image undergoes labeling, and pixel sequences indicating the outer circumference are extracted for respective labeled regions (label regions). Of the label regions, a label region in which the obtained pixel sequence is formed of four line segments having a length of a predetermined value or more is selected as a rectangular marker candidate (5020' in FIG. 4B), thus retrieving four break points (four vertices). Then, as shown in FIG. 4C, line segments are obtained by applying a line fitting process to each two vertices, and intersections of these four line segments are set as four vertices of the rectangular marker candidate (step S107). The extracted marker candidate is registered in a marker candidate list generated on the storage unit 1090 together with the vertex coordinates (step S109).

Figure 7:
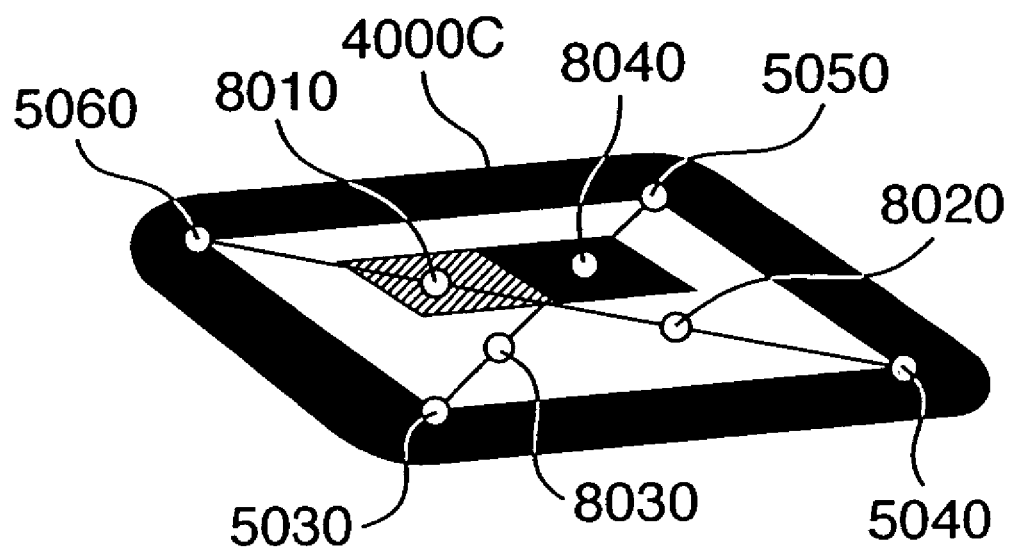
FIG. 7 is a view for explaining the direction detection process of a marker in the first embodiment.

Next, it is checked if each detected marker candidate is a projected image of an actual marker or a detection error of an object other than the marker due to noise or appearance of an unintended object. At the same time, the direction of the marker on the image plane is detected (step S111). FIG. 7 is a schematic view showing the checking process. Checking is attained by drawing two diagonal lines of the rectangular marker candidate, and using pixel values on the binary image (the image in FIG. 4B generated during the marker detection process) at points 8010, 8020, 8030, and 8040 (a total of four points on the two diagonal lines) that equally divide the diagonal lines into three. More specifically, it is checked if a layout in which pixel values are [black, arbitrary, white, white] is found when the four points are checked counterclockwise to have each point as a start point (for example, the four points 8030, 8020, 8040, and 8010 to have 8030 as the start point). If such layout is found, it is determined that the marker candidate is a rectangular marker (step S113, "N"); otherwise (step S113, "Y"), it is determined that the marker candidate is erroneously detected, and the marker candidate is deleted from the marker candidate list (step S115). In the example of FIG. 7, this condition is met when 8040 is set as the start point, and the rectangular marker is determined.

Alternatively, by referring to pixel values (lightness values) of the captured image without using the binary image generated during the marker detection process, it may be determined with reference to a predetermined criterion if a layout [dark, arbitrary, bright, bright] is found. This process determines erroneous detection, and also includes a process for obtaining the direction of the marker. The direction, on the screen, of the rectangular marker determined as the marker can be uniquely specified. That is, a vertex closest to the start point (8040 in the example of FIG. 7) is 5050 (a vertex closest to the rectangle 5010), and IDs can be assigned to vertices counterclockwise in the order of 5060, 5030, and 5040.

Finally, it is identified which of a plurality of markers set on the movable object 3010 the detected rectangular marker is (step S117). Since the ID of the rectangular marker is expressed by the colored small rectangle 5000 inside the marker, it is discriminated by the color of a point (which corresponds to the right neighboring point (8010 in the example of FIG. 7) of the start point of the four points on the diagonal lines used in the marker direction detection process) on the small rectangle 5000 by using the projected image of the detected rectangular marker. Note that the color of this colored small rectangle 5000 is acquired with reference to the same pixel position of the captured image (color image) used in the detection process in place of the binary image generated during the marker detection process.

The following processing results obtained by the marker detection unit 1050 are stored in the storage unit 1090.

Detected marker list (IDs and image coordinates of vertices)

Binary image generated during the marker detection process

FIG. 12 shows an example of the detected marker list. In FIG. 12, No. is a serial number of each detected marker. The coordinates of respective vertices are stored in turn, and the identified marker ID is finally stored.

<Detection/deletion Process of Marker with Suspicion of Partial Occlusion>

The processing executed by the adjacent color checking unit 1060 in step S9050 will be described below with reference to the flowchart of FIG. 11.

The adjacent color checking unit 1060 checks if an adjacent region of each marker included in the detected marker list stored in the storage unit 1090 includes a designated color, and deletes a marker whose adjacent region includes the designated color from the detected list.

A color to be designated in advance is not particularly limited, and a color of an object or the like that may occlude a marker may be designated according to the contents of an application that uses markers. In the adjacent color checking unit 1060 of this embodiment, an application in which the observer may occlude a marker by the hand is assumed, as shown in FIG. 3. In this case, when a marker is partially occluded by the observer's hand like the rectangular marker 4000A in FIG. 5A, an image of the user's hand exists in a region that neighbors a rectangular region (to be referred to as a marker region) detected as a marker, as shown in FIG. 5C. Therefore, in order to determine possibility of occlusion by the hand, the flesh color of the user is registered in the storage unit 1090 as the designated color, and whether or not the adjacent region of the marker region includes a pixel of the designated color is detected, thus detecting the presence/absence of the possibility of occlusion by the hand.

When the flesh color region such as the user's hand region is extracted as a region to be rendered so as to be located in front of the virtual object (so as not to be occluded by the virtual object) in order to generate an MR image that accurately expresses the depth ordering, improved processing efficiency is realized if the virtual image generation unit 110 using information associated with the flesh color region detected by the adjacent color checking unit 1060. In this case, however, a broader range of the adjacent region from which the flesh color is to be detected must be assured.

Alternatively, a flesh color region extraction unit that extracts a designated color (flesh color in this case) region may be added to extract a flesh color region included in the captured image read out from the storage unit 1090, and information associated with that region may be used in the virtual image generation process of the virtual image generation unit 1110 and the process of the adjacent color checking unit 1060. In this case, the flesh color region extraction unit stores the coordinate value of the flesh region in the captured image in the storage unit 1090, and the virtual image generation process and the process for checking the presence/absence of a flesh color pixel in the adjacent region can be done, thus allowing the efficient processes. Such flesh color region extraction unit can also be implemented by the CPU in a software manner as in the adjacent color checking unit 1060.

By applying a dilation process to the marker region included in the binary image (the image generated during the marker detection process (step S105 in FIG. 10) by the marker detection unit 1050) held in the storage unit 1090, the "adjacent region" of the marker region can be obtained as a region from which the obtained region (larger than the marker region) is removed from the original marker region. The range of the "adjacent region" to be checked may be a region one pixel broader than the marker region, or may be a region having a larger pixel width.

The presence/absence of a flesh color pixel in the adjacent region is detected by checking each pixel at corresponding coordinates on the captured image with respect to a region which is determined as the adjacent region on the binary image. In this embodiment, YCbCr values (upper and lower limit values of Y, Cb, and Cr) indicating a flesh color are registered in the storage unit 1090, and the presence/absence of a flesh color pixel (strictly speaking, a pixel having a pixel value falling within the range of the YCbCr values indicating the flesh color) in the adjacent region is detected. Note that not only the flesh color but also a color of another object exists on the space to be captured may be designated as the color of an object which is likely to cause occlusion, or a plurality of colors may be designated at the same time.

Figure 11:
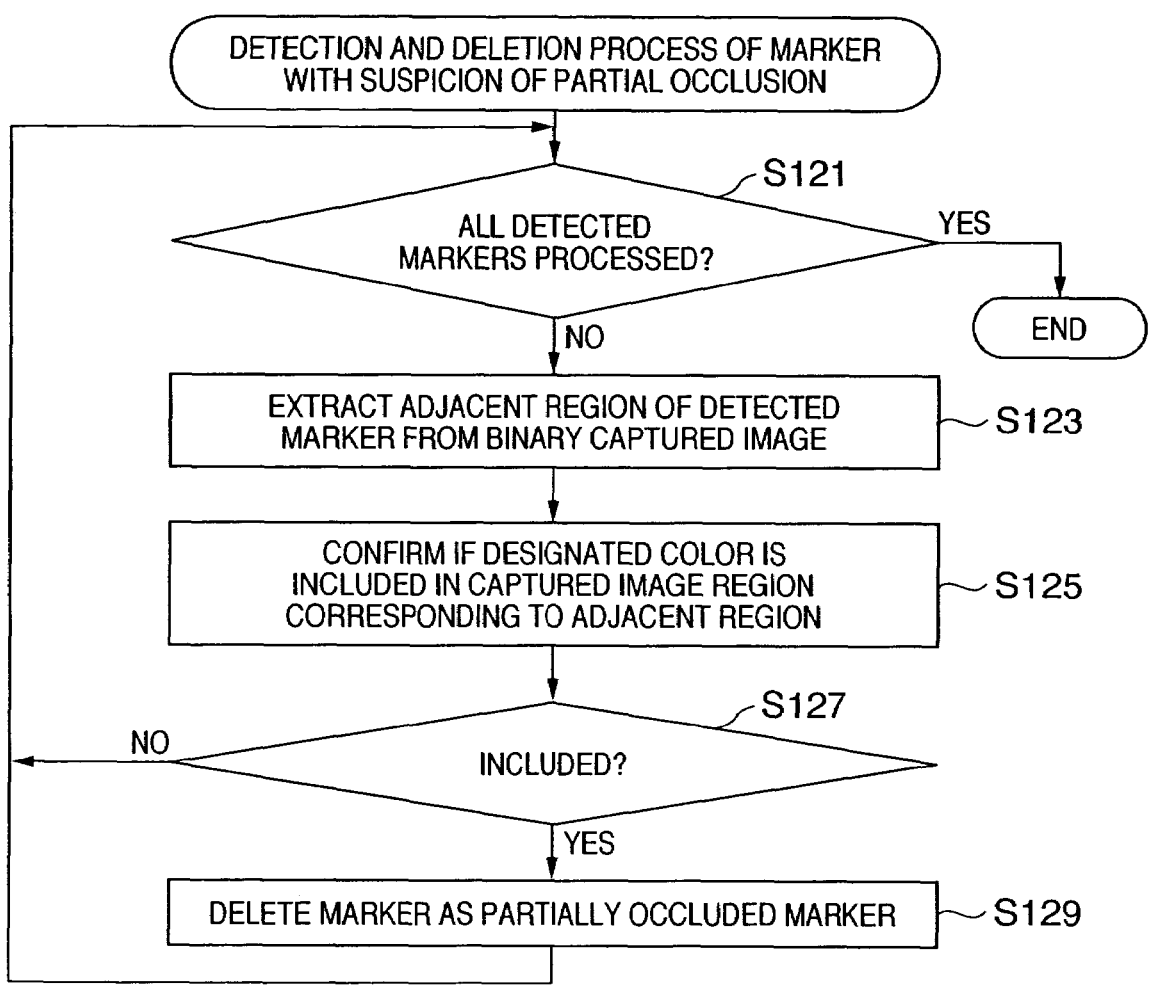
FIG. 11 is a flowchart for explaining the process of an adjacent color checking unit 1060 in the first embodiment.

Referring to FIG. 11, the adjacent color checking unit 1060 checks if the process is complete for all detected markers registered in the detected marker list in the storage unit 1090 (step S121). If the process is complete for all the detected markers, the process ends; if the detected markers to be processed still remain, the flow advances to step S123.

In step S123, the adjacent region of the detected marker to be processed is extracted from the binary captured image stored in the storage unit 1090. It is checked in step S125 if a region of the (non-binarized, color) captured image corresponding to the extracted adjacent region includes a pixel of the designated color. As a result, if the designated color pixel is included, the detected marker to be processed (information associated with that marker) is deleted from the detected marker list (step S129). On the other hand, if no designated color pixel is included, the flow returns to step S121 to check if the detected markers to be processed still remain.

Note that a criterion upon determining if the adjacent region includes the designated color pixel in the process of step S125 can be appropriately set on the basis of the conditions of the type, size, and the like of an object that may cause partial occlusion, actual trial and error, and the like. For example, if the adjacent region includes at least one designated color pixel, "including" may be determined, or if the adjacent region includes a predetermined number (ratio) or more of designated color pixels or it successively includes a predetermined number or more of designated color pixels (or a region including predetermined number or more of designated color pixels), "including" may be determined. Also, determination may be made by combining a plurality of conditions. Furthermore, when a plurality of designated colors are set, determination conditions may be set in correspondence with these designated colors.

As described above, according to this embodiment, a marker with suspicion of partial occlusion can be determined by a simple process. Since the position and orientation of the image sensing unit are estimated without using such marker, the position and orientation estimation result with higher precision can be obtained.

[Modification 1]

In the first embodiment, when the adjacent region of the detected marker includes a specific color, it is determined that the marker has suspicion of partial occlusion, and that marker is deleted from the detected marker list. However, the determination method of erroneous detection due to partial occlusion is not limited to this. A color (surrounding color) of a surrounding region where the marker is set may be acquired when the marker is not occluded, and may be registered in the storage unit 1090. The adjacent color checking unit 1060 checks if the adjacent region of the detected marker includes a color other than the registered surrounding color. If a color other than the surrounding color is detected, that marker may be deleted from the detected marker list.

The arrangement of the MR space presentation system of this modification is the same as that in the block diagram of FIG. 1. However, the internal process of the adjacent color checking unit 1060 is different. As the surrounding color to be registered in advance in the storage unit 1090, a color (black in the example of FIGS. 4A to 4C) of the surrounding portion of the marker may be manually registered, or it may be automatically acquired by capturing the surrounding portion of the marker in a non-occluded state. For example, when a semisphere having the marker as the center is captured at intervals that divide the semisphere into 10 in the vertical and horizontal directions, surrounding colors can be acquired from various directions. However, it should be noted in the acquisition process that the object of the real space must be replaced by one which has no flesh color or must be removed so that a color that is more likely to cause occlusion (in this embodiment, the flesh color of the hand) is not included in the captured image as a surrounding color.

In the processing sequence of this modification, the process in step S125 in FIG. 11 can be replaced by a process for determining the presence of a color other than the color of the surrounding portion registered in advance in place of the designated color. Other processes are executed in the same flow as in FIG. 11.

With the method of this modification, even when partial occlusion of the marker by the hand may occur, since the color of the hand is not registered as the surrounding color, occlusion can be detected. As a result, the position and orientation of the image sensing unit 1010 can be estimated using only correctly detected markers, thus also improving the precision.

[Modification 2]

In the first embodiment, when the list includes, as the detected marker, the rectangular marker which is determined to have suspicion of partial occlusion, that rectangular marker is deleted from the list. More specifically, all pieces of information (i.e., all four pieces of vertex information) obtained from the detected marker which is determined to have suspicion of partial occlusion are not used. However, even in the partially occluded detected marker, two pieces of information associated with the vertices 5050 and 5060 which are not occluded are correctly detected. This modification is characterized in that vertex information which may not be occluded of the detected marker with suspicion of partial occlusion is not discarded, and is used in calculations of the position and orientation of the image sensing unit position and orientation estimation unit 1080.

The arrangement of the MR space presentation system of this modification is the same as that in the block diagram of FIG. 1. However, the internal process of the adjacent color checking unit 1060 is different. In the first embodiment, the adjacent color checking unit 1060 simultaneously checks the adjacent region of the detected marker. Contrary to this, in this modification, the adjacent regions of respective vertices of the detected marker are independently checked. More specifically, pixels within a predetermined adjacent region having each vertex as the center (e.g., an adjacent region included in a circle having a radius of 10 pixels) are checked. If the surrounding region of one vertex includes the designated color, this vertex is deleted from the list. In this case, the coordinate value of the vertex may be deleted, but any other methods may be used as long as the coordinate value of the vertex can be invalidated. For example, the following method may be adopted. That is, as shown in FIG. 13, a flag f indicating erroneous detection due to partial occlusion is assured in the vertex of interest of the detected marker in the detected marker list. Then, 0 is set for a normal vertex, and 1 is set for erroneously detected vertex coordinates, thus clarifying that the coordinate value is left but is invalid. In this manner, since the vertex that can be used is left in the list, the image sensing unit position and orientation estimation unit 1080 can use information of non-occluded vertices even in the partially occluded rectangular marker in estimation of the position and orientation of the image sensing unit 1010.

Figure 9:
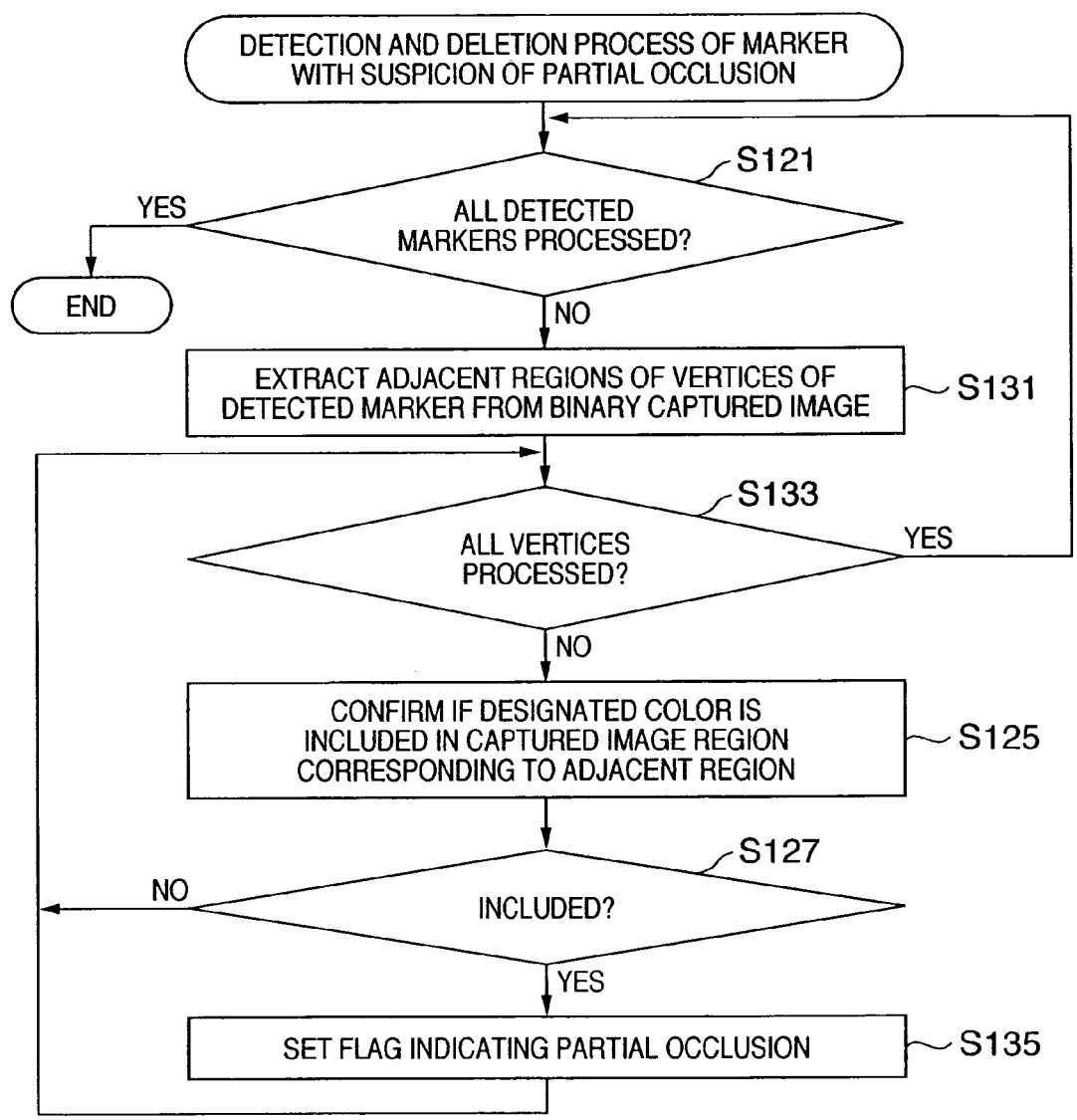
FIG. 9 is a flowchart for explaining the process of an adjacent color checking unit 1060 in modification 2 of the first embodiment.

FIG. 9 is a flowchart showing the processing sequence of this modification. FIG. 9 includes the basic process common to that in FIG. 11 explained in the first embodiment. Differences are: the adjacent regions are extracted for respective vertices (step S131), the presence/absence checking process of a designated color pixel in the adjacent region (steps S125 and S127) is done for respective vertices (determination step S133 to attain such process is added), and only the vertex corresponding to the adjacent region including the designated color is deleted (invalidating its information by setting the flag; step S135).

Note that modifications 1 and 2 can be used in combination, and a method of deleting (invalidating), when a color other than the designated color is detected, that vertex may be used.

[Modification 3]

In the first embodiment, the rectangular marker having a feature shown in FIGS. 4A to 4C is used. However, erroneous detection due to partial occlusion can be determined using a marker other than this marker. For example, when a rectangular marker including an identification pattern disclosed in the paper "Mixed reality: Future dreams seen at the border between real and virtual worlds" is used, the marker detection unit 1050 is replaced by a detection unit of that marker, which executes binarization using a fixed threshold, marker identification by means of template matching, and vertex position detection by line fitting of contour line data. By storing the detected marker regions and a list of detected markers in the storage unit 1090, the process of the aforementioned adjacent color checking unit 1060 can delete an erroneously detected marker due to partial occlusion.

Also, when a circular marker (to be referred to as a color region marker hereinafter), which has a color that can be distinguished from the background, as shown in FIGS. 6A and 6B, is used, erroneous detection due to partial occlusion can be similarly determined. In this case, the marker detection unit 1050 is replaced by a process for detecting a specific color region in place of a specific shape, and the process of the aforementioned adjacent color checking unit 1060 is applied to the detected color region, thus deleting an erroneously detected marker due to partial occlusion. In addition, even when markers having any other visual features are used, an erroneously detected marker due to partial occlusion can be excluded from use in the position and orientation estimation process of the image sensing unit by the method described in the above embodiment as long as a condition in that an object color (e.g., flesh color) that occludes the marker exists on the adjacent region when partial occlusion has occurred is met.

[Modification 4]

In the first embodiment, the marker detection unit 1050 and adjacent color checking unit 1060 are independent units. However, the processing step of the adjacent color checking unit 1060 may be included in the function of the marker detection unit 1050. In this case, the adjacent color checking step need not always be executed after the marker detection process. For example, after a marker candidate region is detected by a rectangle fitting process, the adjacent color checking process may be executed to delete a region which may have possibility of partial occlusion. After that, subsequent processes such as noise removal, direction detection, and so forth may be executed. Also, the processes may be executed in other orders. The gist of the present invention does not depend on such orders of processes.

[Modification 5]

The MR space presentation system of the first embodiment aims at superimposing a virtual object on the real object 3010 which is movable by the hand. However, the present invention is not limited to such specific relationship between the real space and image sensing unit. For example, when the position and orientation of the image sensing unit on a room space are measured by observing markers adhered on the room space for the purpose of superimposing a virtual object on the room space, an MR space presentation system which can suppress the position and orientation estimation precision drop using information of a partially occluded marker can be constructed by the same arrangement as in the first embodiment.

[Modification 6]

In the first embodiment, the adjacent regions are checked for all the detected markers to eliminate erroneous detection. However, the present invention is not limited to the process for checking the adjacent regions of all the markers, and a marker which is present in the adjacent region of the color region of interest may be determined as an erroneously detected marker and may be deleted. For example, the present invention can be applied to a case wherein a color region of a given object which may cause occlusion are detected from all pixels of the captured image, and a marker included in a color region adjacent to that of the object is considered as an erroneously detected marker and deleted from the detected marker list.

Figure 14:
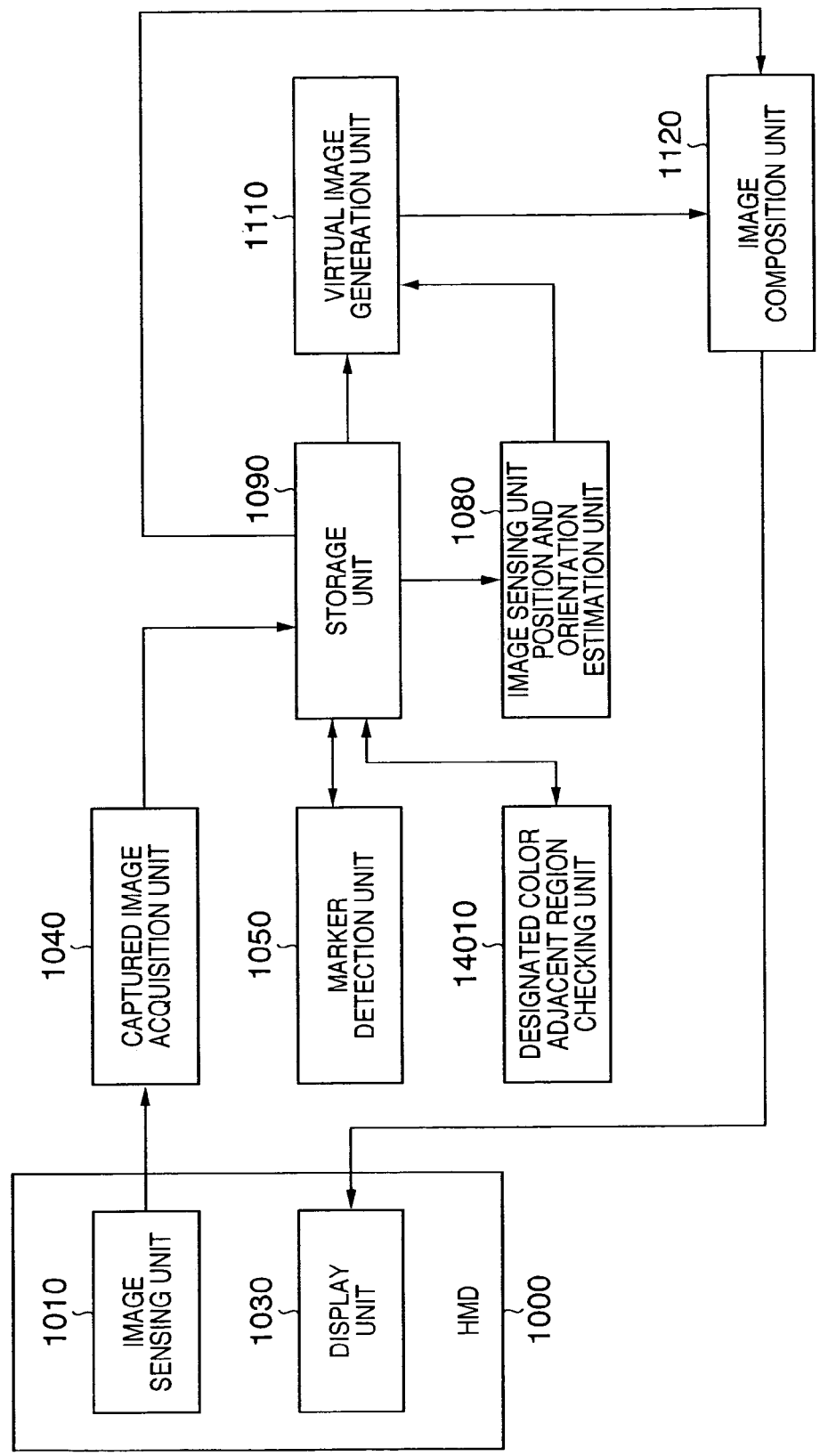
FIG. 14 is a block diagram showing an example of the functional arrangement of an MR space presentation system including a marker detection apparatus according to modification 6 of the first embodiment.

FIG. 14 is a block diagram showing an example of the functional arrangement of an MR space presentation system including a marker detection apparatus according to this modification. This modification is different from the first embodiment in that the adjacent region checking unit 1060 is replaced by a designated color adjacent region checking unit 14010.

The designated color adjacent region checking unit 14010 labels all pixels of the captured image using a designated color in the storage unit 1090, and sets that result as a "designated color region". At this time, of a plurality of candidate regions, a region in which the number of pixels is equal to or smaller than a threshold may be excluded as noise from the candidates of the designated color regions. A dilation process is applied to the generated "designated color region", and a region obtained by removing the original designated color region from the obtained region is acquired as a "designated color adjacent region". At this time, if a feature point of a marker candidate region detected by marker detection is included in the designated color adjacent region, a marker having this feature point is deleted from the detected marker list. The range of the "designated color adjacent region" to be checked may be a region one pixel broader than the marker region, or may be a region having a larger pixel width.

Figure 15:
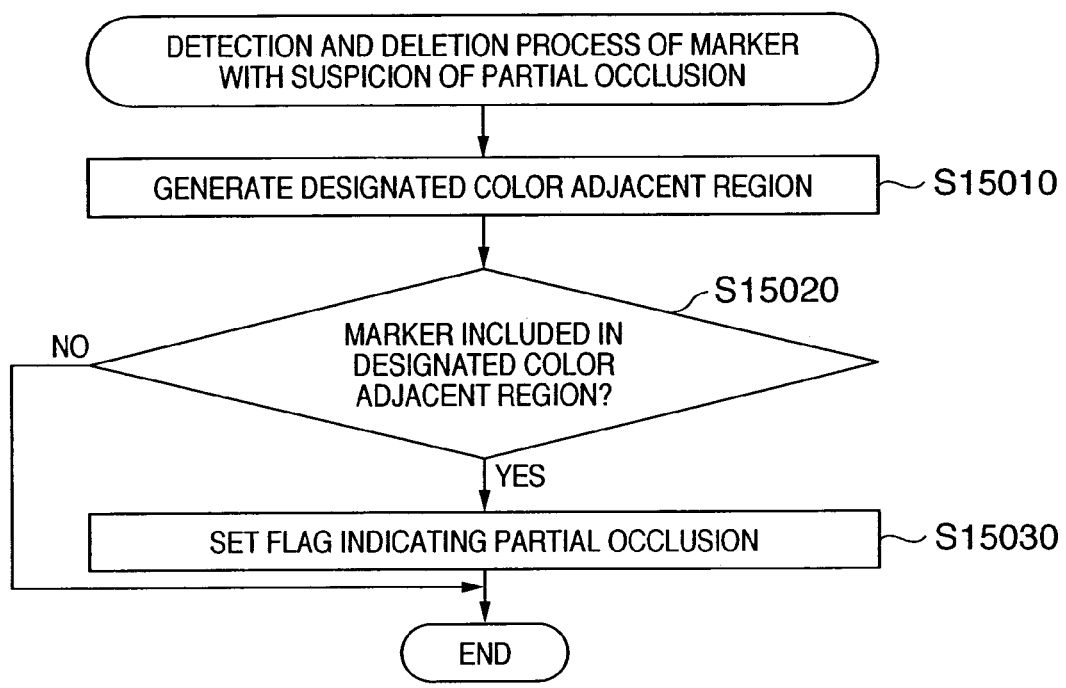
FIG. 15 is a flowchart for explaining the processing of a designated color adjacent region checking unit 14010 in modification 6 of the first embodiment.

FIG. 15 is a flowchart showing the processing sequence of the designated color adjacent region checking unit 14010 in this modification.

In step S15010, the designated color adjacent region checking unit 14010 labels all pixels of the captured image using a color designated in the storage unit 1090, and generates the aforementioned designated color adjacent regions.

It is checked in step S15020 if a feature point of a marker candidate is included in the designated color adjacent region. If the feature point is included, the detected marker (information associated with it) to be processed is deleted from the detected marker list (step S15030). If no feature point is included, the checking process ends.

[Modification 7]

Note that the application range of the determination method of marker erroneous detection due to partial occlusion in the first embodiment is not limited to the MR space presentation system based on the arrangement in the first embodiment. For example, the present invention can be applied to an MR space presentation system which further attaches a 6 DOF position and orientation sensor, as described in the paper "Robust Registration Method for Merging Real and Virtual Worlds-Combining 6 DOF Sensor and ICP Algorithm-", to the HMD 1000, and comprises a mechanism for correcting errors of sensor measured values by observing markers adhered on the room space. With this arrangement, since the position and orientation of the image sensing unit are estimated based on marker information, and the sensor measured values are corrected using the estimation result, the improvement of the precision of position and orientation estimated from the markers can improve the final precision of the estimated position and orientation.

In this manner, the aforementioned method can be applied to every MR space presentation systems that obtain the position and orientation of the image sensing unit using the marker coordinates in the captured image and known marker coordinates. Furthermore, the aforementioned method can be used for the purpose of improving the reliability of marker detection in every applications that obtain the position and orientation of an image sensing device (or an object that mounts the image sensing device; or an object observed by the image sensing device) by detecting markers. Also, the aforementioned method can be applied to intended purposes other than position and orientation estimation, and any other applications that accurately perform marker detection on the image.

Other Embodiment

Note that the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, on the basis of an instruction of the program code, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-106243 filed on Mar. 31, 2004, which is hereby incorporated by reference herein.

What is claimed is:

1. A marker detection method comprising steps of:
   acquiring a captured image;
   detecting a marker from the captured image;
   determining whether or not a surrounding region of the detected marker includes a pixel of a predetermined color; and
   determining, as a valid marker, a marker for which it is determined that the surrounding region does not include any pixel of the predetermined color.

2. The method according to claim 1, wherein the predetermined color is a color of an object that may occlude the marker.

3. The method according to claim 1, further comprising:
   registering a color of the surrounding region of the marker, wherein the predetermined color is a color other than a color which should be present around the marker.

4. The method according to claim 1, wherein the predetermined color is a flesh color.

5. The method according to claim 1, wherein the marker is one of a plurality of feature points included in a marker region.

6. The method according to claim 5, wherein the marker region is a rectangle, and
   the plurality of feature points are vertices of the rectangle.

7. The method according to claim 1, further comprising:
   storing position information of the marker; and
   estimating a position and orientation of an image sensing apparatus which captures the captured image using an image position of the marker which is determined as the valid marker, and the position information of that marker.

8. The method according to claim 7, further comprising:
   generating an image of a virtual object on the basis of the position and orientation of the image sensing apparatus; and
   compositing the image of the virtual object onto the captured image.

9. A computer readable medium encoded with a computer program for making a computer execute steps of a marker detection method, said method comprising steps of:
   acquiring a captured image;
   detecting a marker from the captured image;
   determining whether or not a surrounding region of the detected marker includes a pixel of a predetermined color; and
   determining, as a valid marker, a marker for which it is determined that the surrounding region does not include any pixel of the predetermined color.

10. An information processing method comprising steps of:
    acquiring a captured image;
    detecting a marker from the captured image;
    detecting a predetermined color region from the captured image; and
    determining, based on a position of the predetermined color region and a position of the marker, whether or not the marker is valid.

11. The method according to claim 10, wherein the predetermined color region is a flesh color region.

12. The method according to claim 10, further comprising:
    storing position information of the marker;
    estimating a position and orientation of an image sensing apparatus which captures the captured image using an image position of the marker which is determined as the valid marker, and the position information of that marker;
    generating a virtual image on the basis of the position and orientation of the image sensing apparatus; and
    compositing the virtual image and the captured image on the basis of the predetermined color region.

13. A computer readable medium encoded with a computer program for making a computer execute steps of an information processing method, said method comprising steps of:
    acquiring a captured image;
    detecting a marker from the captured image;
    detecting a predetermined color region from the captured image; and
    determining based on a position of the predetermined color region and a position of the marker whether or not the marker is valid.

14. A marker detection apparatus comprising:
    acquiring unit adapted to acquire a captured image;
    detecting unit adapted to detect a marker from the captured image;
    first determining unit adapted to determine whether or not a surrounding region of the detected marker includes a pixel of a predetermined color; and
    second determining unit adapted to determine, as a valid marker, a marker for which it is determined that the surrounding region does not include any pixel of the predetermined color.

15. An information processing apparatus comprising:
    acquiring unit adapted to acquire a captured image;
    first detecting unit adapted to detect a marker from the captured image;
    second detecting unit adapted to detect a predetermined color region from the captured image; and
    determining unit adapted to determine, based on a position of the predetermined color region and a position of the marker, whether or not the marker is valid.

* * * * *